United States Patent [19]
Edwards

[11] 4,041,906
[45] Aug. 16, 1977

[54] ENERGY SYSTEM PRODUCING ELECTRICITY, HOT WATER AND STEAM FROM COMBUSTIBLE REFUSE

[76] Inventor: Raymond S. Edwards, 4367 N. Miller Road, Scottsdale, Ariz. 85251

[21] Appl. No.: 677,073

[22] Filed: Apr. 14, 1976

[51] Int. Cl.² .................. F22B 33/00; F22B 31/00
[52] U.S. Cl. ................................ 122/2; 122/24; 110/10; 110/106
[58] Field of Search .......... 122/2, 24; 110/7 R, 110/8 R, 8 C, 8 A, 10, 106

[56] References Cited
U.S. PATENT DOCUMENTS

| 2,148,981 | 2/1939 | Dundas et al. | 110/15 |
| 3,171,465 | 3/1965 | Rydberg | 122/24 |
| 3,606,847 | 9/1971 | Reilly | 122/2 |
| 3,670,669 | 6/1972 | Hoad | 110/8 |

FOREIGN PATENT DOCUMENTS

| 1,306,561 | 2/1973 | United Kingdom | 110/7 |

Primary Examiner—Kenneth W. Sprague
Attorney, Agent, or Firm—Warren F. B. Lindsley

[57] ABSTRACT

An energy system which burns refuse inside a steam chamber to drive a steam turbine and an electrical generator. In addition to the electrical energy produced, hot water and steam are delivered as by-products.

3 Claims, 1 Drawing Figure

ENERGY SYSTEM PRODUCING ELECTRICITY, HOT WATER AND STEAM FROM COMBUSTIBLE REFUSE

BACKGROUND OF THE INVENTION

Two particularly challenging problems facing the world today are the energy shortage and waste disposal. Both problems are most pronounced in the highly industrialized population centers to which the people are drawn more and more in developing societies.

Since the turn of the century, the rapid industrialization of the U.S. has progressed almost without concern for any limitations on the availability of energy. Coal was available in seemingly unlimited supply. Oil and natural gas were abundant at home and oil could be imported from a number of foreign sources at a very reasonable cost.

Because oil and natural gas offered convenience and a lower level of atmospheric pollution, the trend toward a greater use of these fuels began gradually and then accelerated as environmental concerns became more pronounced. With the trend toward the cleaner fuels, there came a gradual awareness that the U.S. could no longer consider itself to be self sufficient in terms of energy and the country began looking for other energy sources including nuclear energy. There was as yet, however, no real sense of alarm.

With the recent crisis in the Middle East and the Oil Embargo, there was an abrupt change in the energy picture as viewed by the people and the leadership of the country. It was immediately recognized that alternative energy sources must be developed as rapidly as possible to compensate for the short supply and the increasingly high cost of oil.

In the face of this sudden challenge, a number of complications arose which made the problem unexpectedly difficult. Environmentalists raised their voices against the polluting effects of coal, against the devastation of the land by strip mining and concerning the risks associated with nuclear power. Our attempts to develop our own sources of natural gas by off-shore drilling and the construction of the Alaskan oil line have also been hindered and delayed because of environmental concerns.

This trend of events has led us to the brink of a very serious crisis and effective and immediate measures are needed to avert a serious economic disaster which is certain to follow if the energy problem is not solved.

The second vexing problem involving the disposal of waste had been developing at the same time. The cost of handling rubbish and cast-off materials from homes and industries was becoming increasingly prohibitive as cities turned to more expensive means of disposal which were more acceptable from environmental considerations. Such means included covering refuse with soil and then developing parks and recreation areas over the covered refuse.

By this time, a few astute and observant industrialists began to recognize the paradox that here in the midst of an energy shortage a potentially rich source of energy was being plowed under the ground. Clearly, there must be a way to salvage the energy from the waste while at the same time, provide a solution to the waste disposal problem. The present invention provides a means for accomplishing these two important goals.

SUMMARY OF THE INVENTION

In accordance with the invention claimed, an effective and efficent energy system is provided which utilizes combustible refuse as a fuel from which it generates electrical energy, steam and hot water for municipal or industrial use.

It is, therefore, one object of this invention to provide a means for utilizing refuse as a valuable energy source.

Another object of this invention is to provide an improved energy system which utilizes refuse exclusively as its fuel.

A further object of this invention is to provide such a system which has a capability for handling refuse in a convenient form as, for example, in compacted bundles.

A still further object of this invention is to provide in such a system a means for burning the refuse which effectively circumvents the problems ordinarily encountered in burning such materials, as, for example the fouling of the apparatus with carbon and soot and the emission of pollutants to the atmosphere.

A still further object of this invention is to provide in such a sytem a high degree of versatility in terms of the form of the energy developed, such versatility including a capability to deliver electricity, hot water and steam in controlled proportions.

A still further object of this invention is to provide versatility also in a second sense, namely that the energy system should be adaptable for municipal use or for industrial applications.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
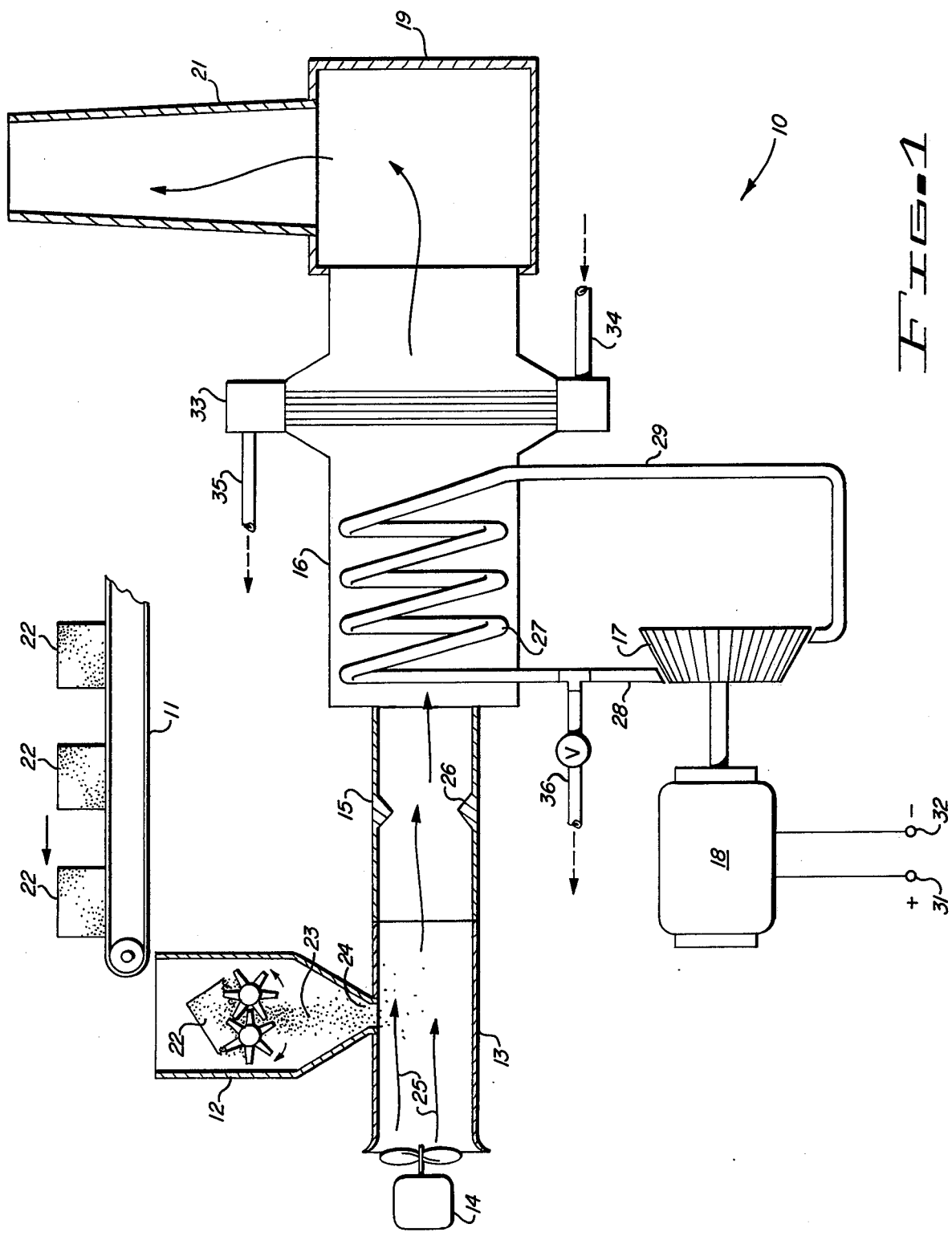
FIG. 1 is a symbolid representation of the energy system of the invention.

Referring more particularly to the drawing by characters of reference, FIG. 1 discloses an improved energy system 10 comprising a fuel delivery conveyor 11, a pulverizer 12, an inlet tube 13, a blower 14, a pulse-jet sonic burner 15, a steam generator 16, a steam turbine 17 coupled to an electric generator 18, a precipitator 19 and a stack 21. As indicated in the drawing, the blower 14, the inlet tube 13, the burner 15, the steam generator 16, and the precipitator 19 are serially connected from left to right in the order listed and air, fuel and products of combustion move through these serially connected elements from left to right.

Bales of compacted refuse 22 are delivered to the generator 10 by conveyor 11, a conventional conveyor belt, falling off the end of the conveyor into the pulverizer 12. Pulverizer 12 thoroughly shreds and pulverizes the compacted fuel into very small particles 23 which enter inlet tube 13 through an injection port 24 to be caught up by the very high velocity air stream 25 introduced into the inlet of tube 13 through the action of blower 14.

The airborne particles of fuel are carried into burner 15 at very high velocity where the finely divided particles of fuel are burned at an exceedingly high rate due to the abundant air supply. The burner 15 is a commercially available unit as manufactured by the Sonic Jet Company of California. Its design incorporates special contours and restrictions 26 in its generally cylindrical form which set up high frequency pulsations which may include sonic pulsations, for example, in the flow patterns of the burning gases as they pass through the burner at high velocities. These pulsations are highly effective in breaking loose and freeing any collected particles of combustion products which tend to collect on the walls of the converter 15 and on coils of steam line 27. The burner 15 and the coils of steam line 27 are thus made self-cleaning and for this reason, they are particularly well adapted for application to the present invention because the refuse employed as fuel is especially prone to the formation of combustion products which characteristically foul and clog combustion equipment.

The very high temperature combustion gases from burner 15 are passed through steam generator 16 which incorporates a coiled steam line 27. Line 27 is in intimate contact with the high area inner surface of generator 16 over which the hot gases are moved to effect an efficient transfer of thermal energy from the gases to the water-steam mixture carried by the line 27.

High pressure, high energy steam thus developed inside steam generator 16 is delivered by a steam line 28 to steam turbine 17, and returns from turbine 17 as low energy steam via line 29. Turbine 17 operated by steam from generator 16 is mechanically coupled to electric generator 18 which converts the mechanical energy developed by turbine 17 into electrical energy.

Generator 18 may be a direct current or an alternating current generator, although a direct current type is most readily controlled in this application because of the need to regulate frequency in the case of the alternating current type. If a direct current generator is employed, the d-c voltage delivered at terminals 31 and 32 may be connected to a-c by means of a static converter.

Surrounding the housing of steam generator 16 is a water jacket 33 into which water is introduced through a water inlet line 34. The water in jacket 33 is heated by excess thermal energy from generator 16 and is delivered through line 35 as hot water for industrial, commerical or residential use. Excess steam is also available for heating or other use from a steam exhaust line 36.

Exhaust gases from burner 15 and generator 16 pass through precipitator 19 where essentially all solid products which would otherwise be emitted as smoke and pollutants are effectively removed prior to release of the cleaned exhaust gas through the stack 21.

A complete and versatile energy system is thus provided which is particularly well suited to the utilization of combustible refuse as a fuel. The capability for using compacted refuse facilitates better control of the fuel feed rate consistent with load demand for the system. Pulverization of the fuel allows the high rate of combustion essential for steam generation. The use of the pulse jet sonic burner eliminates problems of combustion products contaminating the burner and the steam generator and the incorporation of the precipitator prevents atmospheric contamination.

The system is highly modular in construction and its total capacity may readily be scaled up to any desired level by connecting units in parallel. Parts of the system would then, of course, be utilized in common such as the conveyor, the precipitator, the stack, the turbine and the electric generator. The system is thus adaptable for use in municipal or industrial applications.

It is also worthy of note that a part of the cost of operating the system in a municipal application can be charged to the disposal of the refuse. A highly efficient system is thus provided which affords a solution to the dual problems of energy and refuse disposal as addressed by this invention.

Although but a single embodiment of the present invention has been illustrated and described, it will be apparent to those skilled in the art that various changes may be made therein without departing from the spirit of the invention or from the scope of the appended claims.

What is claimed is:

1. A refuse burner, energy generating system comprising in combination:
    a pulse-jet sonic burner,
    an inlet port for the introduction of refuse into said burner,
    a pulverizer for feeding small particles of refuse through said inlet port into said burner,
    means coaxially arranged with said burner for driving air and refuse introduced through said inlet port under pressure into and through said burner,
    a steam generator comprising a coil of fluid conducting tubing coaxially arranged with said burner within the path of movement of the driven air and refuse for receiving the burning gases of said burner for heating fluid in said tubing,
    a water jacket surrounding said generator in heat conductive relationship therewith for conducting water therethrough for heating by the burning gases passing through said generator, and
    a precipitator connected to said generator for removing the smoke and pollutant matters emitted by said generator prior to exhaustion to atmosphere,
    said burner comprising a generally cylindrical form employing a restriction along its length for creating high frequency pulsations in the flow pattern of the burning gases passing therethrough.

2. The refuse burner, energy generating system set forth in claim 1 in further combination with:
    conveyor means for feeding into said pulverizer processed, pre-shaped refuse.

3. The refuse burner, energy generating system set forth in claim 1 wherein:
    said burner generates sonic frequency pulsations.

* * * * *